United States Patent [19]
Krumm

[11] Patent Number: 5,983,147
[45] Date of Patent: Nov. 9, 1999

[54] VIDEO OCCUPANT DETECTION AND CLASSIFICATION

[75] Inventor: John C. Krumm, Albuquerque, N.Mex.

[73] Assignee: Sandia Corporation, Albuquerque, N.Mex.

[21] Appl. No.: 08/796,250

[22] Filed: Feb. 6, 1997

[51] Int. Cl.$^6$ ................................................... B60R 21/32
[52] U.S. Cl. ................................. 701/45; 701/28; 280/735
[58] Field of Search ........................ 701/45, 28; 280/735

[56] References Cited

U.S. PATENT DOCUMENTS

| | | | |
|---|---|---|---|
| 5,446,661 | 8/1995 | Gioutsos et al. | 701/45 |
| 5,494,311 | 2/1996 | Blackburn et al. | 280/735 |
| 5,528,698 | 6/1996 | Kamei et al. | 280/735 |
| 5,531,472 | 7/1996 | Semchena et al. | 280/735 |

*Primary Examiner*—William A. Cuchlinski, Jr.
*Assistant Examiner*—Olga Hernandez
*Attorney, Agent, or Firm*—George H. Libman

[57] ABSTRACT

A system for determining when it is not safe to arm a vehicle airbag by storing representations of known situations as observed by a camera at a passenger seat; and comparing a representation of a camera output of the current situation to the stored representations to determine the known situation most closely represented by the current situation. In the preferred embodiment, the stored representations include the presence or absence of a person or infant seat in the front passenger seat of an automobile.

19 Claims, 3 Drawing Sheets

VIDEO OCCUPANT DETECTION AND CLASSIFICATION

The United States Government has rights in this invention pursuant to Department of Energy Contract No. DE-AC04-94AL85000 with Sandia Corporation.

CROSS REFERENCE TO RELATED APPLICATIONS (None)

BACKGROUND OF THE INVENTION

The present invention relates generally to automotive vehicle occupant restraint systems, particularly air bags. It relates more specifically to mechanisms for selectively modifying the deployment of such systems.

Inflatable occupant restraint, or air bag, systems have come into widespread use in the automotive industry. Although these devices have proved to be very successful in reducing the secondary collision between a vehicle occupant and the interior of the vehicle in the event of an accident, there are certain instances in which it is desirable to reduce the inflation power or disable operation of an air bag system. One such instance occurs when the occupant is seated in a rear facing infant seat (RFIS), because the air bag can (and has) injure or kill such occupants by slamming the RFIS toward the rear of the vehicle. Another instance occurs when the passenger weighs less than 66 pounds, because such passengers are especially vulnerable to the high impact force of the air bag. Also, occupants who are for some reason near the air bag, such as short vehicle operators, can be powerfully impacted by an inflating air bag. Finally, it is undesirable to deploy the air bag when the passenger seat is empty, because the replacement cost of an air bag is on the order of $700.

To overcome these problems, various techniques have been suggested to selectively disable the air bag. The simplest of these techniques, an operator-controlled switch to selectively disconnect the electrical circuitry to the air bag, is not considered to be a preferred solution because it is dependent upon user input to ensure that the switch is in the proper orientation dependent upon the situation. Accordingly, the desired objective is to automatically reduce the inflation power or totally disable the inflation of the air bag depending on the weight, size, and position of the occupant, as well as to disable deployment when the occupant is in a RFIS or when the seat is empty.

U.S. Pat. No. 5,570,903 of Meister et al. discloses a system utilizing a weight sensor in the seat and magnetic or optical sensors which communicate with corresponding devices mounted on a RFIS. One disadvantage of this system is the requirement that a special RFIS be used with the system. Another disadvantage that has been discovered with systems using weight sensors is that the weight detected by the sensor changes as the occupant moves in the seat. Thus weight sensors are not considered in the industry to be a reliable indicator for activation of an air bag.

SUMMARY OF THE INVENTION

It is an object of this invention to utilize video sensors to determine how a vehicle seat is occupied.

It is another object of this invention to utilize range information to determine if a predetermined object exists in a video scene.

It is still another object of this invention to utilize depth information to estimate the weight, size, and position of a person in a video scene.

Additional objects, advantages, and novel features of the invention will become apparent to those skilled in the art upon examination of the following description or may be learned by practice of the invention. The objects and advantages of the invention may be realized and attained as particularly pointed out in the appended claims.

To achieve the foregoing and other objects, and in accordance with the purpose of the present invention, as embodied and broadly described herein, the present invention may comprise a system for distinguishing situations at a specified location which includes a camera having a lens and providing an output corresponding to an image observed by the lens; a computer for storing representations of known situations as observed by a camera at the specified location; and a signal processor for comparing a representation of the camera output to the stored representations to determine the known situation most closely represented by the output signal. In the preferred embodiment, the stored representations include the presence or absence of a person or infant seat in the front passenger seat of an automobile. The present invention may also comprise a system for processing range data of the occupant; and a procedure for determining the weight, size, and position of the occupant based on the range data.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

Figure 1:
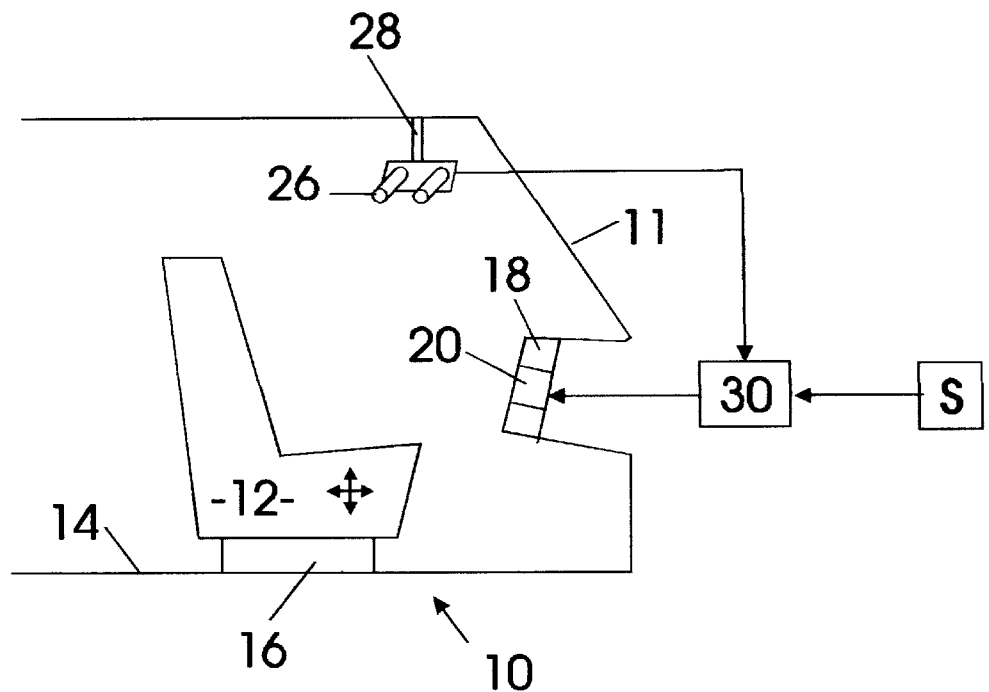
FIG. 1 shows a partial view of the interior of a vehicle utilizing the invention.

As shown in FIG. 1, a vehicle 10 such as an automobile may have a seat 12 affixed to vehicle floor 14 by a track 16. As is well known in the art, the position of seat 12 with respect to vehicle 10 is adjustable. As is also well known in the art, vehicle 10 may have an air bag 20 stored within dashboard in front of seat 12 to protect a passenger seated in seat 12 from internal collision with dashboard 18 or windshield 11. In the event of a rapid deceleration of vehicle 10, a sensor S within vehicle 10 initiates an output to cause an electrical signal to activate airbag 20, which device rapidly expands to occupy the space between seat 12 and dashboard 18.

Since it is useful for airbag 20 to deploy only when seat 12 is occupied, and studies have shown that an occupant is safe when airbag 20 deploys only if that person is properly restrained by a seat belt, not seated too close to the airbag, and weighs at least 66 pounds, in accordance with this invention, a controller 30 may be provided to disable the electrical connection between sensor S and airbag 20 or reduce the power of the air bag 20 upon receipt of video information from one or two cameras 26 affixed to vehicle 10 by bracket 28 at some location such as a front door pillar.

The following sections describe four different embodiments of the invention. "Occupant Classification" refers to the classification of an image or images of the vehicle seat into categories "empty", "occupied by RFIS", or "occupied by person". Classification into the first two categories will cause the air bag to be totally disabled. The section "Occupant Range Determination" describes an embodiment to measure the distance between the occupant and landmark points in the vehicle, such as the dashboard. If the occupant is near a given landmark point, the air bag may be deployed at reduced power or totally disabled. The third section, "Occupant Weight Determination", describes a method for determining the weight of the occupant from a range image. The weight estimate can be used to reduce the power or totally disable the air bag. The final section, "Occupant Weight and Position Determination", describes another method to determine the occupant's weight and position simultaneously, which information can be used to reduce the power or totally disable the air bag.

Occupant Classification

In accordance with a preferred embodiment of this invention, controller 30 includes a programmed computer. As outlined in FIG. 2, controller 30 functions at block 34 to capture an image $\bar{v}_i$ from tubular camera 26 and compare it in block 36 to a representation of stored images corresponding to known situations from block 40, such as when seat 12 is empty or when it is occupied by a RFIS. As set forth hereinafter, should a correlation be made between image $\bar{v}_i$ and either of the known situations, controller 30 disarms airbag 20. If image $\bar{v}_i$ does not correlate to either known situation, seat 12 is assumed to be occupied and airbag 20 is armed.

One problem that must be solved by a video system in this application is caused by the many possible variations in a scene for any situation. For example, an empty seat may be subjected to many variations of light and shade as both the vehicle and the earth move with respect to the sun. In addition, the position of the seat may be changed by its users. Accordingly, the stored image must represent a great many possible variations of each known situation. However, since it is desirable to minimize the cost of controller 30, its computing power is not likely to be substantial.

A first step at reducing the variables is to histogram-equalize each image from camera 24 to remap the image's intensities, thereby spreading them more evenly over available gray levels. Using monotonically nondecreasing gray level mapping, histogram equalization helped recover acceptable images taken in dark conditions.

Figure 2:
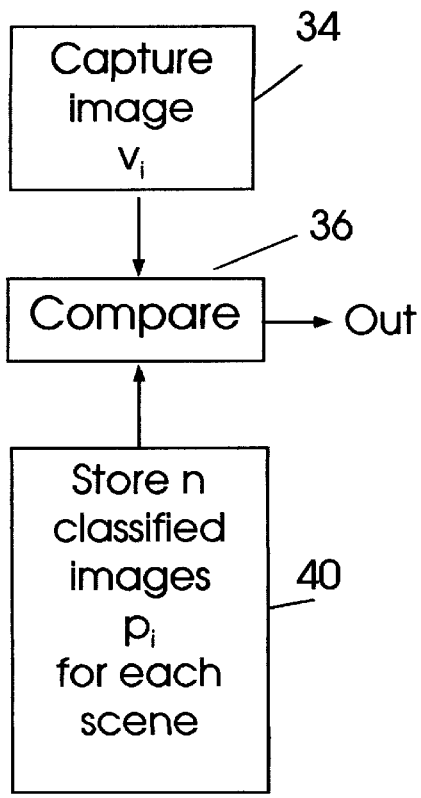
FIG. 2 shows a flow diagram of the operation of the controller of the invention.
Figure 3:
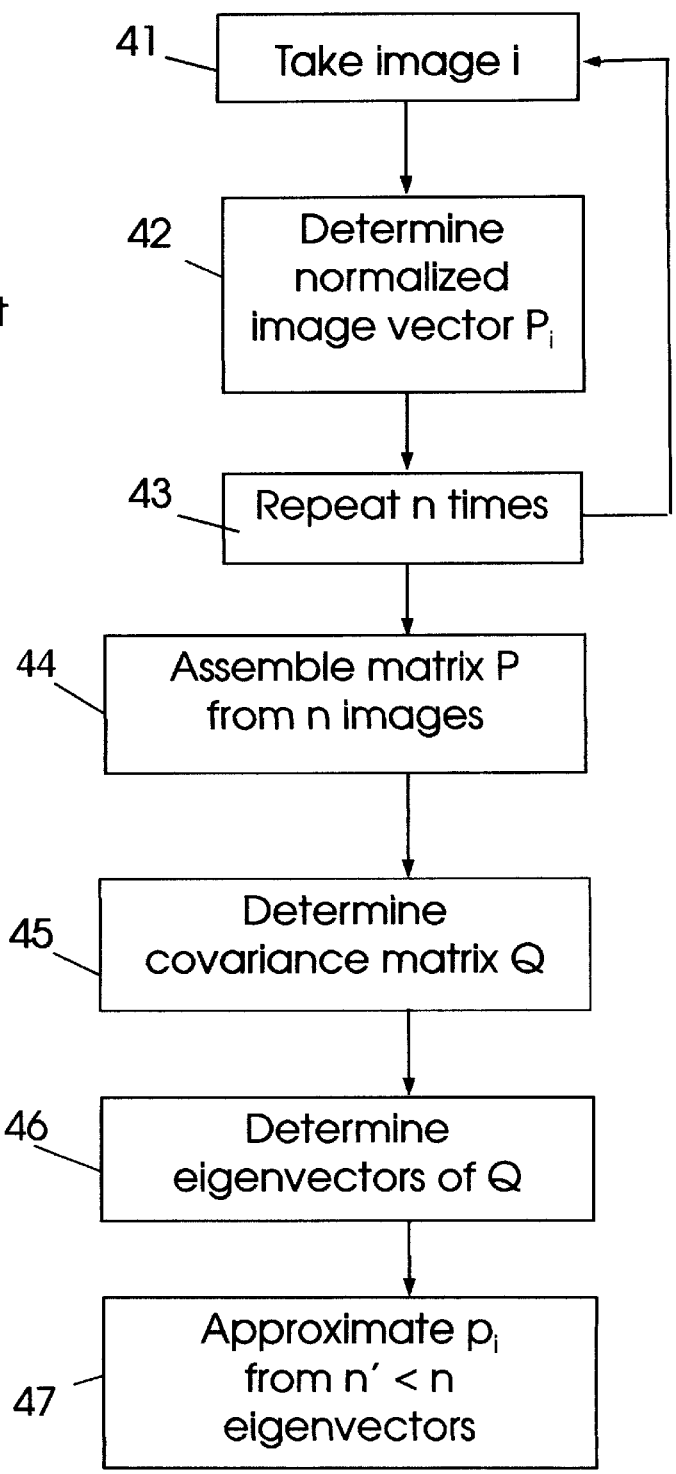
FIG. 3 shows a flow diagram of a portion of FIG. 2.

FIG. 3 outlines a set of steps for block 40 of FIG. 2 that provides a solution to this problem. As set forth in blocks 41–43, n images are taken of a known situation, such as an empty seat, with the seat in different positions and in different sunlight conditions. Each image consisted of rows, r, and 64 columns, c, of pixels defining the image; a typical image from an inexpensive video camera. Each image was sequentially scanned to form a column vector, $\bar{p}_i=(n_c n_r)\times 1$. To simplify calculations, each vector is normalized whereby $\bar{p}_i \cdot \bar{p}_i = 1$.

To avoid having to compare the captured image $\bar{v}_i$ with each of the more than 100 images $\bar{p}_i$ made of each known situation, the system analyzes the principle components of the vectors $\bar{p}_i$ making up a given situation (i.e., RFIS or empty). As indicated in block 44, the n prototype vectors in a given situation are assembled into a matrix P= $|\bar{p}_0 - a\bar{p}_1 - a \ldots \bar{p}_{n-1} - a|$, where $a$ is the scalar mean value of all the elements of all the $\bar{p}_i$'s of the prototype situation. As indicated in blocks 45, the covariance matrix $Q=PP^T$ is then determined. In block 46, the eigenvectors of Q, $\bar{e}_0$, $\bar{e}_1$, $\bar{e}_2, \ldots \bar{e}_{n-1}$ are determined to form an orthonormal basis set for the vectors of the known situation. $\bar{p}_i$ can be expressed as a weighted sum of the eigenvectors:

$$\bar{p}_i = \sum_{j=0}^{n-1}(c_{ij}\bar{e}_j) + a, \text{ where } c_{ij} = (\bar{p}_i - a) \cdot \bar{e}_j.$$

Since the eigenvectors associated with the highest eigenvalues account for most of the variance of the prototype vectors, these vectors may be approximated with less than all n eigenvectors. Accordingly, as denoted in block 47, $$\bar{p}_i \approx \sum_{j=0}^{n'-1 \ll n}(c_{ij}\bar{e}_j) + a, \qquad \text{(Eq. 1)}$$

where n' is determined experimentally. For the instant invention, approximately 100 images each of an empty seat and a RFIS yielded good results with n'=18. The $c_{ij}$ coefficients provide a compressed representation of the images in an n'-dimensional space.

The unknown vector $\bar{v}$ can also be decomposed with the eigenvectors of the prototype situation, where $$\bar{v}_i \approx \sum_{j=0}^{n'-1 \ll n}(d_j\bar{e}_j) + a, \qquad \text{(Eq. 2)}$$

where $d_j = (\bar{v}_i - a) \cdot \bar{e}_j$.

The distance between two column vectors is given by $\|\bar{v} - \bar{p}_i\|^2 = 2 - 2(\bar{v} \cdot \bar{p}_i)$, when both vectors are normalized. Since $(\bar{v} \cdot \bar{p}_i)$ is the correlation between the two vectors, minimizing the distance between the two vectors is the same as maximizing the correlation between them.

The same calculation may be used to determine the correlation between the reconstructed vectors of equations 1 and 2:

$$\|\bar{v} - \bar{p}_i\|^2 \approx \left\|\sum_{j=0}^{n'-1} d_j\bar{e}_j - \sum_{j=0}^{n'-1} c_{ij}\bar{e}_j\right\|^2 = \sum_{j=0}^{n'-1}(d_j - c_{ij})^2,$$

because $\bar{e}_j \cdot \bar{e}_k = 1$ when i=j and $\bar{e}_j \cdot \bar{e}_k = 0$ when i≠j.

In the preferred embodiment of this invention, the known situations (empty and with RFIS) are classified with an off-line system by taking a number of images and determining eigenvectors $\bar{e}_i$ and weighting coefficients $c_{ij}$ for each situation. For any predetermined configuration of vehicle, this data could be created at the factory and permanently loaded into controller 30.

Each image from camera 24 is histogram-equalized and normalized to produce vector $\bar{v}$. This vector is then projected onto both sets of eigenvectors to produce coefficients $d_j=\bar{v} \cdot \bar{e}_j$ for each of empty seat and RFIS. In other words, this step projects the unclassified input image into the projection coefficient spaces of the two situations.

The input image is compared to the prototype images in both situations by finding their nearest neighbor in both situations. This distance for each situation is:

$$\Delta = \min_i \left( \sum_{j=0}^{n'-1} (d_j - c_j)^2 \right) \quad \text{for } i \in (0, 1, 2, \ldots, n-1).$$

This distance is compared to an experimentally determined threshold to provide an indication whether or not an airbag should be activated. For the preferred embodiment, the airbag 20 is activated only when the minimum distance for each of the empty seat and the RFIS situations is greater than their respective threshold distances, indicating that since the seat is neither empty nor containing a RFIS, it is occupied.

This system was tested in a vehicle that had been trained with approximately 100 images of each situation. For this test the empty seat threshold was set at 0.029 and the RFIS threshold was set at 0.0191, and each situation was classified with 18 eigenvectors. The empty seat class failed to recognize only 3 of 413 empty seat images as empty seats, and it misclassified only 1 of 101 occupied seats as empty. The RFIS class failed to recognize only 1 of 396 RFIS images as having a RFIS, and it misclassified no RFIS images as occupied. Thus, this system made a correct decision regarding activation of the airbag on 99.5% of tested situations.

One potential problem with classifying intensity images, as described above, is that a class with large intensity variations may be difficult to characterize with a limited number of prototype images. Furthermore, because of the great variety of shapes of and colors on the occupant of a seat, intensity could not be used to reliably recognize that a seat is occupied.

Accordingly, another embodiment of the invention utilizes binocular stereo images where the pixels represent range (distance to surface) rather than intensity.

Binocular stereo uses two cameras, generally side-by-side as shown in FIG. 1, pointed at the same scene. Computing range values from the two images is easiest if the corresponding rows of the cameras' two image planes are colinear. That is, each row of the right image should be pointed at the same horizontal slab of space as its corresponding row in the left image. As shown in FIG. 1, a camera jig held the tubular cameras' optical axes approximately parallel and mounted the two cameras to the mounting holes of the driver's side sun visor of a test vehicle. A test program showed that when the horizontal edge of each image was aligned, the vertical position was about nine pixels higher in one image than the other. For all subsequent stereo processing, the left image was shifted vertically by this amount to bring the left and right rows into alignment.

Since these images included a portion of the view through a window, a mask was provided to remove this distraction from each image.

Figure 4:
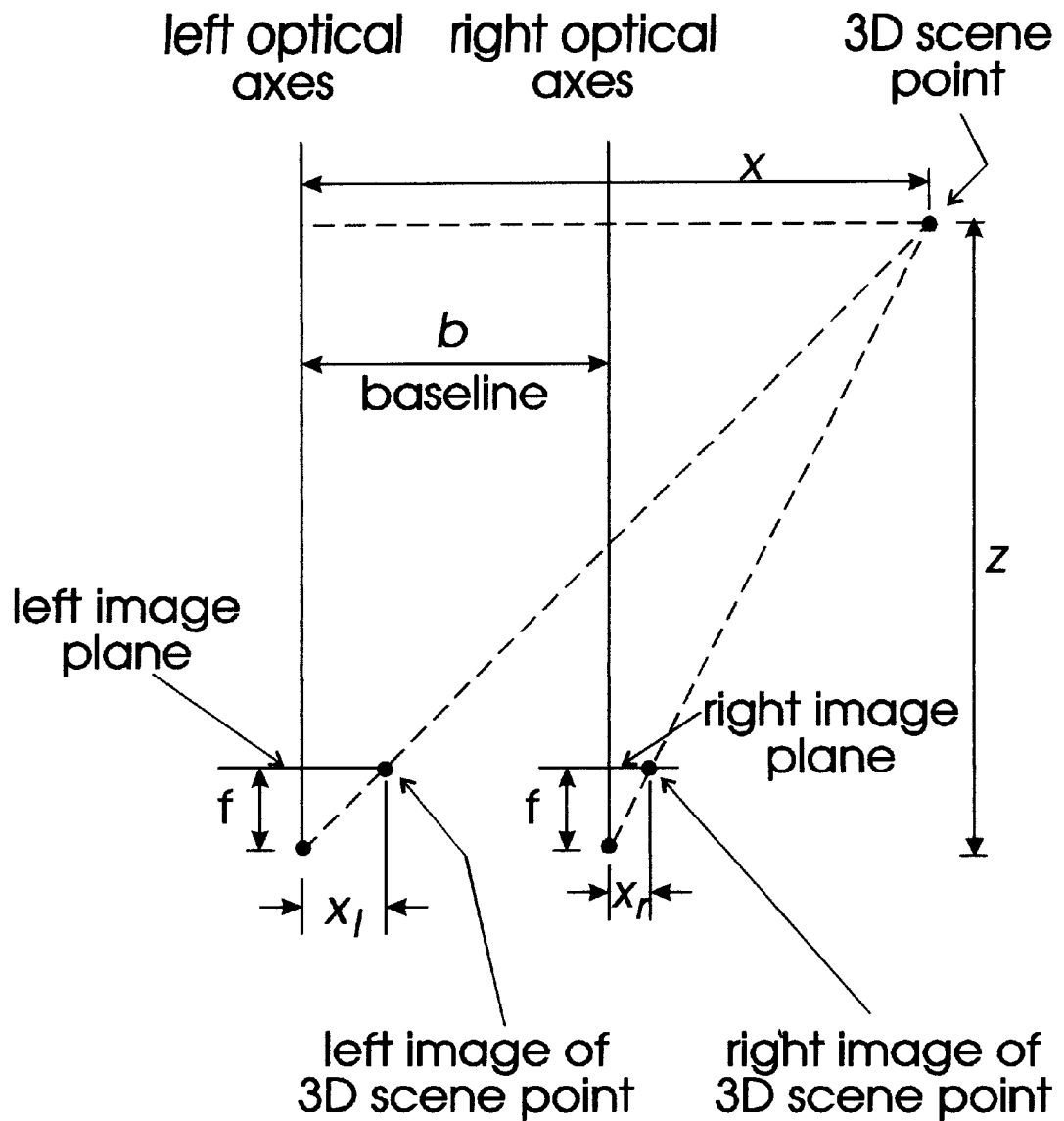
FIG. 4 shows the geometry of the stereo setup.

The geometry of the described binocular stereo system is shown in FIG. 4. The goal is to measure the distance to the 3D scene point. From the images, the following relationships exist between the image coordinates and scene coordinates:

$$\frac{X}{Z} = \frac{x_l}{f} \Rightarrow X = \frac{x_l Z}{f} \quad \text{and} \quad \frac{X-b}{Z} = \frac{x_r}{f} \Rightarrow X = \frac{x_r Z}{f} + b. \quad \text{Eq. 3}$$

Solving equation 3 yields range $$Z = \frac{fb}{x_l - x_r}. \quad \text{Eq. 4}$$

The quantity $x_l - x_r$ is the difference between the positions of the projected 3D scene point in the left and right images, and it is called disparity. Thus, the distance to the 3D scene point is inversely proportional to the disparity.

Although the disparity of points in the scene can then be used in equation 4 to compute range values for these points, this calculation is not necessary because disparity provides an invariant image for classification, the same as range.

To compute disparity, points in the left and right images that correspond to the same point in the 3D scene must be found. This invention uses a "dense" disparity image—one that gives disparity values at every point in the image rather than at just a few points. (The system could be modified to use a smaller number of disparity points for the sake of more efficient computer processing.) The system finds a match in the right image for every pixel in the left image. The difference in the pixel coordinates of these matched points are stored in a disparity image.

For a given pixel in the left image, it is known from the camera alignment described above that a corresponding point in the right image will be either on the same row or a constant offset from the row in the left image.

If the two cameras are perfectly aligned, matching points in the left and right images are found by comparing the gray levels of small patches of pixels surrounding each point to be matched. For a given pixel point in the left image with integer coordinates $(x_l, y)$, a rectangular patch of pixels centered on this point is extracted whose integer dimensions are width x height=$(2l_w+1) \times (2l_h+1)$. For example, in a system with a resolution of 128×120 pixels, $l_w=3$ pixels and $l_h=2$ pixels. This 35 pixel patch is compared with equally-sized patches in the right image for different disparities. As a function of disparity, the quality of the match between the two patches is given by:

$$s(d; x_l, y) = \sum_{j=-l_h}^{l_h} \sum_{i=-l_w}^{l_w} (f_l(x_l + i, y + j) - f_r(x_l - d + i, y + j))^2 \quad \text{Eq. 5}$$

where $f_l(x,y)$ is the left image and $f_r(x,y)$ is the right image. The function of equation 5 is computed for every point in the left image that has a potential match in the right image, which excludes a vertical band of pixels on the left and right side of the left image for which it is known there is no match in the right image. In addition, the minimum and maximum disparity values are limited based on the maximum and minimum distances that are to be viewed in the scene. For this embodiment, disparities were limited to the range [2,5]. The value of disparity d when the function is minimized indicates the range from the cameras to the object represented by the patch of pixels.

The disparities have only a limited range, and if their values are confined to integers, the resulting disparity images may not have sufficient discriminatory power. Accordingly, subpixel disparities are determined based on a technique described by Larry Matthies, *Dynamic Stereo Vision*, (Ph.D. Thesis), Carnegie Mellon University School of Computer Science, Tech. Rpt CMU-CS-89-195, October 1989. After finding the integer disparity with the minimum sum of squared differences, $s(d_0;x_1,y)$, a parabola is fit to this value and its two neighbors, $s(d_0+1;x_1,y)$ and $s(d_0-1;x_1,y)$.

Figure 5:
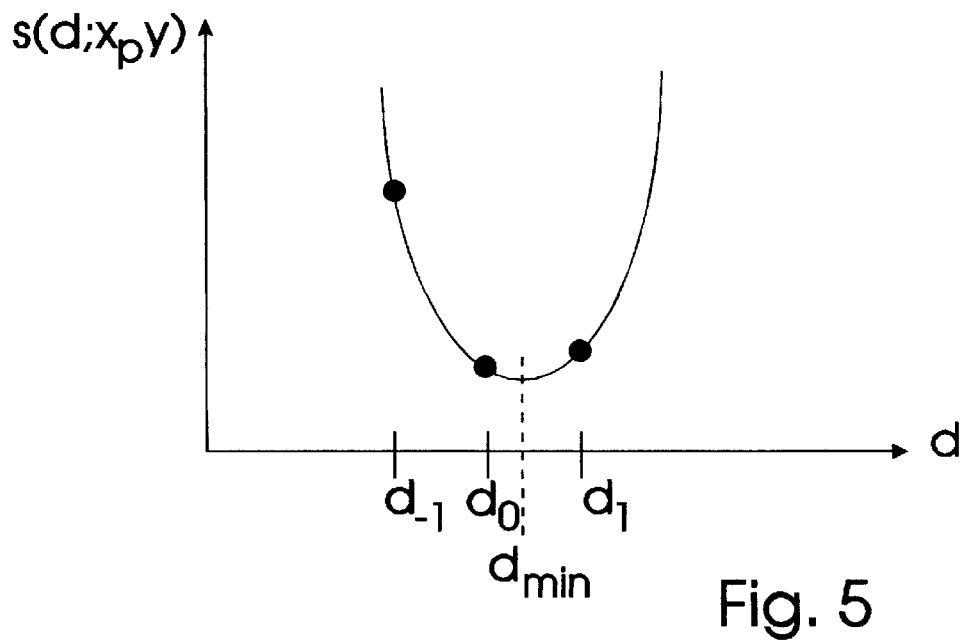
FIG. 5 shows a parabola fit to determine minimum disparity value.

The location of the minimum value of this parabola, $d_{min}$, is the subpixel disparity, as illustrated in FIG. 5. This process is repeated for every pixel in the left image to make real-valued disparity images.

The disparity images may be classified by nearly the same process as shown above for classifying intensity images. Besides the obvious difference of using disparity instead of intensity, another difference is that the images may accurately be classified into three classes (empty, RFIS, occupied) rather than just two (empty, RFIS) as was the case with intensity images.

To test this system, stereo images were collected over a period of seven days from the test vehicle. For the empty and RFIS cases, a stereo pair was taken every five minutes throughout the day, for a total of 429 empty seat pairs and 386 RFIS pairs. The images were split evenly into three seat positions: forward, middle, and back. The same RFIS and doll baby was used for all the RFIS images, except for 10 "minority" RFIS images where a different RFIS was used. In addition, 439 stereo pairs were taken of 22 regular occupants. Of these images, 220 of the occupied seat pairs, 76 empty seat pairs and 68 RFIS pairs were used for training, taken at 30 minute intervals. None of the 10 "minority" RFIS were used for training. All the stereo pairs that were not used for training were used for testing. For the occupied seat, 11 pictured individuals were used for training, and 11 others were used for testing. All the stereo pairs were subjected to the stereo algorithm of equation 5, and all subsequent processing was done on the real-valued disparity images.

Since disparity images are functions of 3D structure and not illumination, they do not need the preprocessing normalization and histogram steps utilized on the intensity images. However, the remainder of the processing is identical to the processing of the intensity images. For each of the three classes of disparity training images, a scalar mean was computed and subtracted from the respective disparity image. A sample covariance matrix was formed for each of the three classes and the eigenvectors were computed. The top 20 eigenvectors were used to project each processed training image into a 20-dimensional point.

In one trial for classifying disparity images, each image was projected onto the 20 eigenvectors of each training class, giving three 20-dimensional points (one for each potential class). The euclidean distance was computed between this projection and all the projected training images. The input image was classified with the same class as its nearest neighbor. This method achieved a classification accuracy of 93%.

For another test the classification program was modified to give weights to the three euclidean distances for each of the three classes. After computing the distance between the projection of an unclassified image and the projection of a training image, this distance was scaled by a weighting factor for that training image's class. The optimal weights for the empty, RFIS, and occupied classes were 1.000, 1.016, and 0.792, respectively. Using these weights brought the classification accuracy up to 95% over 890 tests.

The data from these tests showed only one "fatal" airbag retention for 219 occurrences of an occupied seat. However, there was a 5% unwanted deployment rate on RFIS, and a 7% unneeded deployment on empty seats. The weights could be adjusted to decrease the number of fatal errors (fatal retention when occupied and fatal deployment with a RFIS) at the expense of unneeded deployments.

Other embodiments utilizing the teachings of this invention are also contemplated, as it is important not to deploy an air bag with too much force if the occupant is near the installed location of the undeployed air bag (e.g. face near the dashboard). For example, the range images could be used to measure the distance between the occupant and various features of the vehicle interior (e.g. occupant to dashboard distance), and measure the weight and position of the occupant.

Occupant Range Determination

Range images computed from stereo images allow an especially convenient method for measuring the distance between the occupant and interior features, because the silhouette of the occupant can be found by simply computing a numerical difference between a range image of the occupied seat and a previously taken range image of the unoccupied seat. On the range image of the unoccupied seat, there will be designated "landmark" points, which are points to which the occupant's distance should be measured. For instance, the set of landmark points might include range points on the dashboard where the air bag is stored, because the air bag should not be deployed with full force when the occupant is near this region.

The occupant classification technique described above used only stereo disparity images, because absolute range was not important. However, absolute range must be determined to compute occupant-to-landmark distances. Given a disparity image of an empty seat, the corresponding range image is designated as $Z=u_i(x,y)$, where $(x,y)$ is a point on the range image in pixel coordinates. The range image of the occupied seat is designated as $Z=p(x,y)$. Since the seat can be adjusted to different positions, there will be several different, prestored ranges images of the empty seat, $u_i(x,y)$, $i=1,2,\ldots,n$, where n is the number of prestored empty seat range images, with each image representing the empty seat adjusted to a different position.

In order to isolate the occupant's range points from the rest of the occupant range image, it is necessary to first determine which empty seat range image to use. If we use an empty seat range image that has the seat adjusted to a different position that what the occupant has, then there will be significant range differences at points on the seat as well as points on the occupant. Finding the right empty seat range image to use is accomplished by comparing each of the prestored range images of the empty seat, $u_i(x,y)$, to the range image of the occupied seat, $p(x,y)$. The $u_i(x,y)$ that most closely resembles $p(x,y)$ is chosen as the empty seat range image to use. The correct $u_i(x,y)$ is determined by computing a series of range difference indicator images, $$d_i(x, y) = \begin{cases} 0 & \text{if } |p(x, y) - u_i(x, y)| < t \\ 1 & \text{otherwise} \end{cases},$$

where t is a small range value accounting for the inevitable inaccuracies in the range measurements. The image $d_i(x,y)$ will contain a "0" wherever the range images $u_i(x,y)$ and $p(x,y)$ have similar values. The image $d_i(x,y)$ with the most zeroes indicates which empty seat image to use, and is designated range image $u^*(x,y)$.

The range points on the occupant are computed by subtracting the background range image of the empty seat, $u^*(x,y)$, from the range image of the occupant, $p(x,y)$, yielding $$m(x, y) = \begin{cases} 0 & \text{if } |p(x, y) - u_*(x, y)| < t \\ 1 & \text{otherwise} \end{cases}.$$

The image m(x,y) is essentially a mask image that shows which parts of the range image fall on the occupant and which range points are part of the background. Any point marked with a "1" in m(x,y) indicates a point on the occupant.

The next step is to compute the absolute 3D coordinates of points on the occupant. A 3D coordinate is calculated for every range point in Z=p(x,y) that has a corresponding value of "1" in m(x,y). The absolute 3D coordinate (X,Y,Z) of a range point p(x,y) is given by:

$$(X, Y, Z) = \left( \frac{(p(x, y) + f)(x - x_c)}{f}, \frac{(p(x, y) + f)(y - y_c)}{f}, p(x, y) \right) \quad \text{Eq. 6}$$

where (x,y) are pixel coordinates on the range image, $(x_c, y_c)$ is the center of the image in pixel coordinates, and f is the focal length of the camera lens. For all the range points marked by a "1" in m(x,y), the absolute 3D coordinates are calculated from Equation 6 and gathered into a set of 3D coordinates $$P = \{(X_{P1}, Y_{P1}, Z_{P1}), (X_{P2}, Y_{P2}, Z_{P2}), (X_{P3}, Y_{P3}, ZP_3), \ldots\}.$$

The absolute 3D coordinates of landmark points are based on the prestored empty seat range images. These points can be designated by picking them from a computer screen image with a mouse, and will include points on the dashboard and other landmark points inside the vehicle. The 3D coordinates of these points are gathered into a set $$L = \{(X_{L1}, Y_{L1}, Z_{L1}), (X_{L2}, Y_{L2}, Z_{L2}), (X_{L3}, Y_{L3}, Z_{L3}), \ldots\}.$$

The final air bag deployment decision is made by comparing the 3D points in L to the 3D points in P. If any of the occupant points falls too close to any of the landmark points, the air bag will not be deployed. However, a more sophisticated embodiment will adjust the power of the air bag deployment depending on which landmark points have been approached by the occupant and the distance separating them.

Occupant Weight Determination

One important parameter in air bag deployment is the weight of the occupant, as occupants of low weight may be injured by a deploying air bag. The video-based weight measurement system of this invention uses the same principles known to the operator of a "guess your weight" booth on a carnival midway. It has been extensively documented that body size (e.g. height) is correlated with body weight. Using the range image of an occupant, certain body dimensions are measured and used as entry points into a correlation table giving weight as a function of body dimensions. The system uses the same procedure as described above for isolating range points on the occupant. A standard feature location algorithm can be used to identify range points corresponding to various features on the occupant (e.g. top of head, shoulders, seat). These points can be used to make dimensional measurements of the occupant's body. Some dimensions, such as torso circumference, are not suitable, because they could be easily inflated by heavy clothes. But other dimensions, such as the seat to the top of the head, should give consistent readings. Given these dimensions, the occupant's weight can be estimated from the correlation table.

Occupant Weight and Position Determination

An advanced approach to air bag deployment is to measure both the occupant's weight and position simultaneously. The essence of this method is to fit a computerized geometric model of an occupant to the actual 3D coordinates of the occupant. With a computerized model (CAD model) having adjustable parameters to control the joint angles and body size, these parameters may be adjusted until the 3D points on the model are in close agreement with the measured 3D points on the occupant. The parameters are examined to determine the size (giving weight) and position of the occupant.

The system uses the same procedure as described above for isolating range points on the occupant. These points are used to compute a set of 3D coordinates on the surface of the occupant, $P = \{(X_{P1}, Y_{P1}, Z_{P1}), (X_{P2}, Y_{P2}, Z_{P2}), (X_{P3}, Y_{P3}, Z_{P3}), \ldots\}$, which was also described above.

The CAD model of the occupant gives a set of 3D coordinates of the outer surface of the occupant. It is parameterized by a vector of joint angles $\bar{j} = (\theta_1, \theta_2, \theta_3, \ldots)$ (e.g. knee angle, shoulder angle, waist angle), body dimensions $\bar{l} = (l_1, l_2, l_3, \ldots)$ (e.g. neck to seat distance, torso width, upper leg length), and overall body position, (X,Y,Z). Depending on the accuracy required, there may be about 15 joint angles and 10 body dimensions. Some body parts, such as the hands, do not have to be modeled in detail. The model is called $s(\bar{j}, \bar{l}, X, Y, Z)$.

The model parameters are adjusted until the surface model of the occupant, $s(\bar{j}, \bar{l}, X, Y, Z)$, comes close to the actual coordinates on the occupant, P. The fit error is measured by the euclidian distance between the actual coordinates and the closest point on the model surface. The parameters are adjusted by a conventional fitting algorithm such as gradient descent. An initial starting guess of the model can be an average-sized human in a normal seating position. After this first model is fit, starting guesses for subsequent fits come from the previous fit.

It is contemplated in the practice of this invention that the overall position of the occupant and the joint angles can be used to adjust the deployment of the air bag, and even to make deployment decisions about multiple air bags in the dashboard and doors. The body dimensions can also be used as described above to estimate the weight of the occupant, further impacting air bag deployment.

The particular sizes and equipment discussed above are cited merely to illustrate particular embodiments of this invention. It is intended that the scope of the invention be defined by the claims appended hereto.

I claim:

1. A system for distinguishing situations at a specified location comprising:
    camera means comprising
        a lens having a field of view encompassing the specified location, and
        output means for providing an output corresponding to an image observed by said lens;
    storage means for storing a vector representation of a plurality of images of a known situation as observed by a camera at the specified location, said vector representation including eigenvectors associated with each image;
    signal processing means for comparing a vector representation of the camera output to the stored representations to determine the stored representation with the highest correlation to the output signal;

means for comparing the highest correlation to a predetermined value; and indicator means for indicating the known situation of the stored signal when the highest correlation exceeds the predetermined value.

2. The system of claim 1 wherein the stored representation of known situation is represented by n' eigenvectors determined from a matrix formed from n eigenvectors representing all n output images of that situation, where n'<<n.

3. The system of claim 2 wherein n'=10 to 20 images.

4. The system of claim 3 wherein n'=18 images.

5. The system of claim 2 wherein the specified location is a vehicle seat, and the known situation is from the group consisting of the seat being occupied by an object or is empty.

6. The system of claim 5 further providing means for disabling a vehicle air bag opposing said seat when said seat is occupied by said object or is empty.

7. The system of claim 5 wherein the object is a child car seat.

8. The system of claim 2 wherein each vector represents the intensity of the image.

9. A system for distinguishing situations at a specified location comprising:

a camera comprising
      a pair of lenses for providing binocular stereo images of the specified location, and
      output means for providing an output corresponding to an image observed by said lens;
   storage means for storing a vector representation of a known situation at the specified location as observed by said camera means, and
   signal processing means for comparing a vector representation of the camera output to the stored representations to determine the stored representation with the highest correlation to the output signal, wherein each vector represents a function of the range of the image from said camera;
   means for comparing the highest correlation to a predetermined value; and
   indicator means for indicating the known situation of the stored signal when the highest correlation exceeds the predetermined value.

10. The system of claim 9 wherein each vector represents disparity of the stereo images.

11. The system of claim 9 wherein the specified location is a vehicle seat, and the known situations consist of the seat being occupied by a person, an object, being empty.

12. The system of claim 11 further providing means for disabling a vehicle air bag opposing said seat when said seat is occupied by said object or is empty.

13. The system of claim 11 wherein said signal processing means determines the size of the person from the range information, and the weight of the person from the size.

14. The system of claim 11 wherein said signal processing means determines the position of the person in the seat from the range information.

15. The system of claim 11 wherein said signal processing means determines the distance between the person in the seat from landmarks in the vehicle from the range information.

16. An efficient system for determining if an image corresponds to a predetermined situation having many variations, comprising:

means for generating a vector $\bar{v}_i$ representing said first image;
   means for correlating $\bar{v}_i$ with a function of n' of n vectors $\bar{p}_i$ representing possible variations of the situation, wherein n'<<n, and correlation which exceeds a predetermined value provides an indication that the image corresponds to the situation.

17. The efficient system of claim 16 further comprising means for determining which n' of the n vectors shall be used, said means comprising:

means for combining the n vectors as a matrix P;
   means for determining the eigenvectors of the covariance matrix of P; and
   means for expressing each vector $\bar{p}'$ as a weighted sum of the n' eigenvectors associated with the highest eigenvalues.

18. An efficient method for determining if an image corresponds to a predetermined situation having many variations, comprising:

capturing an image;
   generating a vector $\bar{v}_i$ representing said image;
   correlating $\bar{v}_i$ with a function of n' of n vectors $\bar{p}_i$ representing possible variations of a situation, wherein n'<<n, and correlation which exceeds a predetermined value provides an indication that the image corresponds to the situation.

19. The efficient method of claim 18 further comprising the step of determining which n' of the n vectors shall be used by:

combining the n vectors as a matrix P;
   determining the eigenvectors of the covariance matrix of P; and
   expressing each vector $\bar{p}_i$ as a weighted sum of the n' eigenvectors associated with the highest eigenvalues.

* * * * *